United States Patent [19]

Smith et al.

[11] Patent Number: 4,495,382

[45] Date of Patent: Jan. 22, 1985

[54] TELEPHONE REGULATOR CIRCUITRY

[75] Inventors: Donald L. Smith; David B. Jones, both of San Jose, Calif.

[73] Assignee: Fairchild Camera and Instrument Corporation, Mountain View, Calif.

[21] Appl. No.: 371,328

[22] Filed: Apr. 23, 1982

[51] Int. Cl.³ .................................. H04M 1/76
[52] U.S. Cl. .......................... 179/81 R; 179/16 F
[58] Field of Search ............ 179/16 F, 70, 71, 77, 179/81 R; 323/223, 225, 311, 312

[56] References Cited

U.S. PATENT DOCUMENTS

| | | | |
|---|---|---|---|
| 3,989,902 | 11/1976 | Cowpland | 179/81 R |
| 4,143,247 | 3/1979 | Yoshitoshi et al. | 179/81 R |
| 4,332,984 | 6/1982 | Davis et al. | 179/81 R |
| 4,360,710 | 11/1982 | Chaput et al. | 179/81 R |
| 4,388,498 | 6/1983 | Geboers et al. | 179/81 R |
| 4,400,588 | 8/1983 | Stobbs et al. | 179/81 R |

OTHER PUBLICATIONS

Erratico et al., "The First Electronic Speech Circuit Opens the Way to the Fully Electronic Telephone", IEEE Transactions on Consumer Electronics, vol. LE-26, Feb. 1980, pp. 73-80.

American Microsystems, Inc., "S2559 A/B/C/D Tone Generator", Jan. 1979, (Brochure).

American Telephone and Telegraph, "Electrical Characteristics of Bell System Network Facilities at the Interface with Voiceband and Ancillary and Data Equipment", Preliminary Bell System Communications Technical Reference, Aug. 1976.

Primary Examiner—Keith E. George
Attorney, Agent, or Firm—Kenneth Olsen; Carl Silverman; Alan H. MacPherson

[57] ABSTRACT

This invention provides a single integrated circuit device which replaces the non-integrated "encapsulated circuit" of the standard prior art telephone set. The circuit of this invention achieves proper D.C. regulation of the telephone line, by presenting one of several possible D.C. impedances to the telephone line when the telephone set is in the off-hook condition. The circuit of this device provides such regulation by varying the gain relationship of the telephone set for various distances from the central switching office, thereby maintaining a rather uniform signal amplitude in a plurality of telephone sets located at various distances from the central switching office. In one embodiment, this is done using a novel regulator substantially completely formed as part of a single integrated circuit chip containing a receiver amplifier, transmitting amplifier, dialing circuitry and ringing circuitry. The use of integrated circuit technology allows many of the circuit components to be formed in a balanced manner thereby substantially improving the audio quality achieved with this invention compared to prior art telephone sets. The transmitter amplifier of this invention allows the use of a number of different microphones, including the standard telephone carbon microphone. In one embodiment of this invention the microphone used is an electret. The transmitter amplifier of this invention provides wide dynamic range and low distortion, while obtaining its power requirements from the telephone line itself. The power requirements of the transmitter amplifier of this invention are minimal, with the transmitter amplifier of this invention being capable of operating with as little as two volts difference between the speech line and the reference potential. The receiver amplifier of this invention provides a differential output voltage for driving the receiver transducer. In this fashion, DC blocking to the earpiece is not required, thereby eliminating the need for a rather expensive and bulky DC blocking capacitor.

9 Claims, 5 Drawing Figures

TELEPHONE REGULATOR CIRCUITRY

BACKGROUND OF THE INVENTION

1. Related Applications

This application is related to U.S. Ser. No. 270,173 filed June 3, 1981, and U.S. Ser. No. 06/360,746 filed Mar. 22, 1982, both on inventions of Koepp which are assigned to Fairchild Camera and Instrument Corporation, the assignee of this application, and both of which are hereby incorporated by reference.

2. Field of the Invention

This invention relates to electronic circuits for use in telephone apparatus.

3. Description of the Prior Art

A schematic diagram of a standard 500 type telephone set, a telephone industry standard, is shown in the March 1979 application noted entitled "S2559 Digital Tone Generator" published by American Microsystems, Inc., which is herein incorporated by reference. Of importance, the "encapsulated circuit" depicted within the dashed lines of the schematic of the 500 type telephone set described in this application note functions to separate the signals on the two wire phone line for use in the receiver transducer and the transmitter transducer. Furthermore, the "encapsulated circuit" is used to provide regulation, wherein the amplitude of the received signal and the amplitude of the transmitted signal are relatively constant in the telephone set regardless of the set's distance from the central switching office. The "encapsulated circuit" also controls the amplitude of the signal transmitted by a telephone set which appears in the receiver of this same telephone set, commonly called sidetone. It has been found that some sidetone is beneficial in maintaining a natural conversation, while an excessive sidetone amplitude will detract from the conversation.

Of importance, the "encapsulated circuit" of the standard 500 type telephone set employs a plurality of discreet components including, in the 500 type telephone set, four discreet capcitors, three discreet resistors, two discreet varistors, two discreet iron core inductors, and one iron core transformer. Prior art telephone sets other than the 500 type are quite similar, employing a plurality of discreet components including iron core inductors and an iron core transformer. The use of such components results in prior art telephones being rather expensive, as well as rather bulky and heavy.

One approach to eliminating the need for the "encapsulated circuit" of the standard prior art telephones is presented by Erratico, et al in an article entitled "The First Electronic Speech Circuit Opens the Way to the Fully-Electronic Telephone", IEEE Transactions on Consumer Electronics, Vol. CE-26, February, 1980 pp. 73–80. Erratico et al utilize one approach to substitute an integrated circuit for the prior art "encapsulated circuit" comprised of discreet components. Another approach is disclosed by the two above-mentioned related patent applications.

SUMMARY

This invention provides a single integrated circuit device which replaces the non-integrated "encapsulated circuit" of the standard prior art telephone set. The circuit of this invention achieves proper D.C. regulation of the telephone line, by presenting one of several possible D.C. impedances to the telephone line when the telephone set is in the off-hook condition. The circuit of this device provides such regulation by varying the voltage/current relationship of the telephone set as a function of distance from the central switching office. Moreover, while providing the required Bell System D.C. regulation, the regulator, receiver amplifier and transmitter amplifier satisfy the Bell System requirement of maintaining an A.C. impedance of approximately 600 ohms over the frequency range of 300 to 3,000 Hz. In one embodiment of this invention, this is done using a novel regulator substantially completely formed as part of a single integrated circuit chip containing a receiver amplifier, transmitter amplifier, dialing circuitry and ringing circuitry. The use of integrated circuit technology allows many of the circuit components to be formed in a balanced manner thereby substantially improving the audio quality achieved with this invention compared to prior art telephone sets.

The transmitter amplifier of this invention allows the use of a number of different microphones, including the standard telephone carbon microphone. The use of microphones other than the standard carbon type microphone is desirable in that cheaper, more reliable microphones than the carbon type may be employed. In one embodiment of this invention the microphone used is an electret. The transmitter amplifier of this invention provides wide dynamic range and low distortion, while obtaining its power requirements from the telephone line itself. The power requirements of the transmitter amplifier of this invention are minimal, with the transmitter amplifier of this invention being capable of operating with as little as two volts difference between the speech line and the reference potential.

The receiver amplifier of this invention provides a differential output voltage for driving the receiver transducer. In this fashion, DC blocking is not required, thereby eliminating the need for a rather expensive and bulky DC blocking capacitor.

Generally the voltage of a telephone line decreases with increasing distance from the central office, due to increasing telephone line resistance. In accordance with this invention, with increasing telephone line resistance, the A.C. gain of the transmitter amplifier increases, thus tending to compensate for the losses to the speech signal caused by the increasing telephone line resistance. Similarly, when lower signal voltages appear on the telephone line further from the central office, the gain of the transmitter amplifier increases. Furthermore, a simple fixed gain amplifier is used as the receiver amplifier, thereby providing a receiver amplifier having receiver characteristics comparable to the type 500 telephone set.

This invention will be more fully understood in accordance with the following detailed description taken together with the drawing.

DETAILED DESCRIPTION

Regulator

Figure 1:
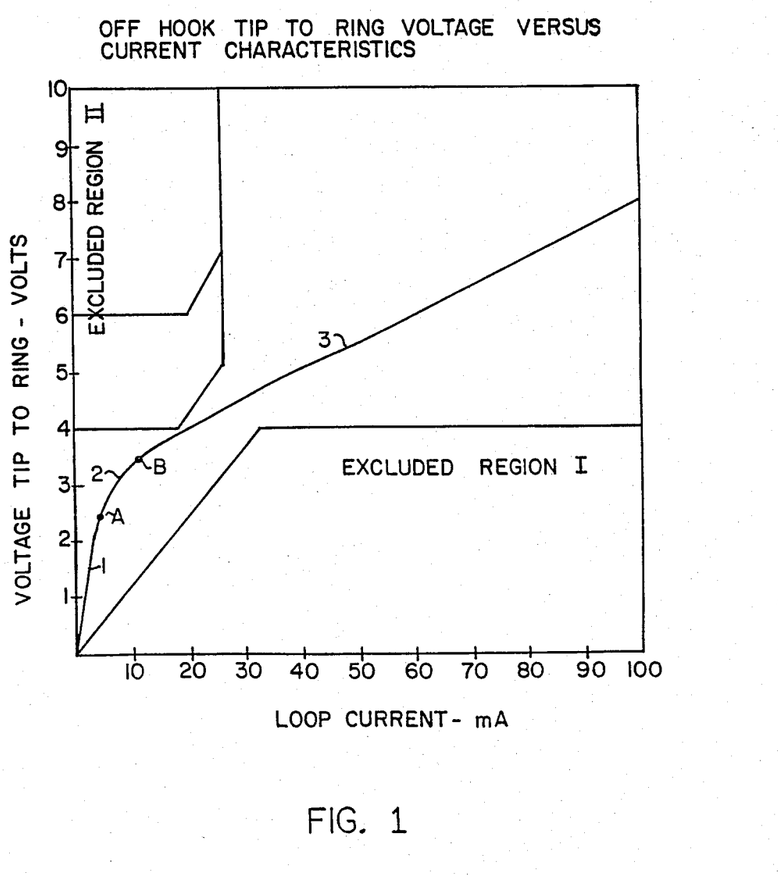
FIG. 1 is a graph of the regulator characteristics of the telephone circuit of this invention and the Bell System line voltage/current requirements.

FIG. 1 is a graph showing the D.C. relationship between the telephone line voltage and the telephone line current provided by the regulator circuit of this invention. Shown in the upper left hand corner of this graph is "Excluded Region II," in which the telephone line voltage/telephone line current characteristic may not lie. This excluded region is a requirement of the Bell System, as specified in the Preliminary Bell System Communications Technical Reference entitled "Electrical Characteristics of Bell System Network Facilities at the Interface with Voice Bank Ancillary and Data Equipment", published August, 1976 by the Engineering Director-Customer Equipment Systems of the American Telephone and Telegraph Company, and referred to as publication 47001. Excluded Region II of FIG. 1 of this specification corresponds to the excluded region specified in FIG. 3 of this Bell System Technical Reference. Similarly, "Excluded Region I" is located in the lower right hand corner of FIG. 1 of this specification, which corresponds to the excluded region specified in FIG. 5 of the aforementioned Bell System Technical Reference, which is hereby incorporated by reference.

As shown by the graph of FIG. 1, the regulator circuitry of this invention provides a telephone line voltage/telephone line current characteristic which meets the Bell System requirements in that it does not enter either Excluded Region I or Excluded Region II. The voltage/current characteristic produced by the regulator of this invention is piecewise linear possessing two breakpoints and three linear portions, as shown. The D.C. voltage level on the line determines which piecewise linear portion of this characteristic is utilized by the telephone.

Figure 2:
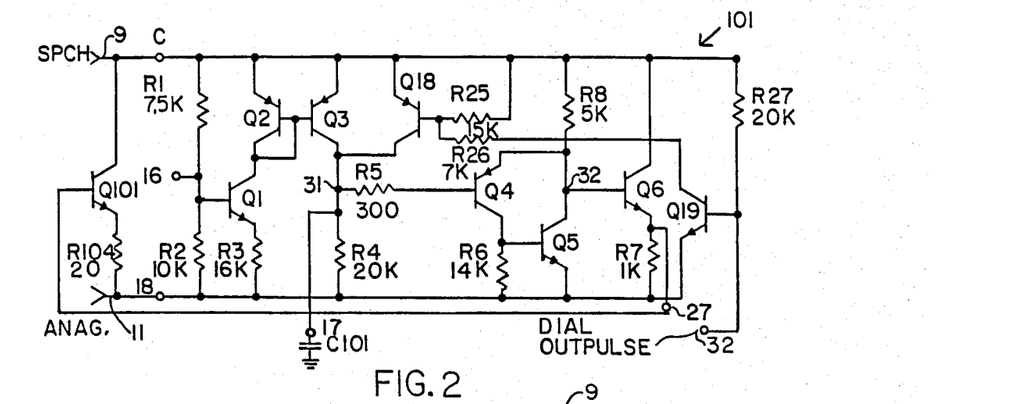
FIG. 2 is a schematic diagram of the regulator circuitry of this invention.

One embodiment of the regulator of this invention is shown in the schematic diagram of FIG. 2. Regulator 101 serves to provide the correct D.C. characteristics required of the telephone system and also serves to provide the proper operating voltages for the transmit and receiver amplifiers, and the dialer circuitry (not shown).

NPN transistor Q101 shunts the required amount of current from speech lead 9 to analog ground 11 (which are connected to the telephone line, often through a polarity reversal diode bridge of well known design) in order to provide the required voltage/current characteristic. NPN transistor Q101 has its collector connected to speech lead 9, its emitter connected through resistor R104 (20 ohms) to analog ground 11, and its base connected to terminal 27. Because transistor Q101 is under certain circumstances, required to shunt currents in excess of 100 milliamps, transistor Q101 is typically provided as a discreet component external to the integrated circuit wehich comprises the regulator, receiver amplifier, transmitter amplifier, dialing circuitry and ringer circuitry when these circuits are formed as an integrated device. Transistor Q101 is, for example, a 2N4401 device manufactured by Fairchild Camera and Instrument Corporation.

Regulator 101 comprises a voltage divider made up of resistors R1 and R2 of 7.5K and 10K ohms, respectively. Preferably, these resistors comprise diffused resistors in the single chip version of this regulator, as do all other resistors of the regulator 101, receiver amplifier 103 (FIG. 3) and transmitter amplifier 104 (FIG. 4), except those resistors which are formed as external components. Resistors R1 and R2 are connected in series between speech lead 9 and analog ground lead 11, which provide the positive supply voltage (V+) and the negative supply voltage (V−), respectively, for the telephone set. It should be noted that where used in the specification and claims, the word "ground" refers to the line used to return the current from the telephone to the central switching office and thus the potential on this line will be variable depending upon the location of the telephone in the system. The ground potential in any given phone will vary as a function of not only distance from the central switching office but also a function of loadings on various phones connected to the line and as a function of anomalies and magnetic fields and transients in the system.

The voltage provided by the voltage divider formed by resistors R1 and R2 is made available on terminal 16, which allows external resistors to be added between speech lead 9 and terminal 16 and ground in order to alter the regulator characteristics, if desired. This voltage from the voltage divider formed by resistors R1 and R2 is also applied to the base of NPN transistor Q1. Transistor Q1, having its emitter connected through resistor R3 (16K) to analog ground 11, serves to amplify the voltage available on terminal 16 thereby providing a collector current through transistor Q1.

PNP transistors Q2 and Q3 are well matched in physical dimensions and dopant levels and thus exhibit identical electrical characteristics. PNP transistors Q2 and Q3, having their emitters connected to speech lead 9, their bases connected in common and to the collector of transistor Q2, form a current mirror wherein the collector current flowing through transistor Q3 is forced to equal the collector current flowing through transistor Q2. The collector current of transistor Q1, which comprises the collector current of transistor Q2 and the negligible base currents of transistors Q2 and Q3, is approximately equal to the collector current through transistor Q2, and thus is also approximately equal to the collector current flowing through transistor Q3.

PNP transistor Q4 and NPN transistor Q5 form a unity gain buffer amplifier having as its input the base of transistor Q4 and as its output the collector of transistor Q5. The collector of transistor Q4 is connected to the base of transistor Q5 and the collector of transistor Q5 is connected to the emitter of transistor Q4. The emitter of transistor Q5 is connected to analog ground 11 and the base of transistor Q5 is connected, through resistor R6 (14K), to analog ground 11. The output node 32 is connected through resistor R8 (5K) to speech lead 9. The unity gain buffer amplifier formed by transistors Q4 and Q5 provides a high input impedance on node 31 which is connected through resistor R5 (300 ohms) to the base of transistor Q4. The unity gain buffer amplifier also provides a very low output impedance on node 32.

The unity gain buffer amplifier formed by transistors Q4 and Q5 amplifies the DC voltage on node 31 and drives NPN transistor Q6. NPN transistor Q6, having its base connected to output node 32 of the unity gain buffer amplifier, its collector connected to speech lead 9, and its emitter connected through resistor R7 (1K) to analog ground 11, serves as an emitter follower. The DC voltage appearing on the emitter of transistor Q6 is applied to the base of transistor Q101, thereby causing transistor Q101 to turn on and, as previously mentioned, the collector current of transistor Q101 serves to provide a portion of the required shunt current between speech lead 9 and analog ground 11, thereby providing the required telephone line voltage/current relationship.

The DC impedance of regulator 101 determines the slope of the voltage/current relationship shown in FIG. 1. This impedance is controlled by the values of resistors R1, R2, R3, R4 and R104. Thus, the slope of the segment 1 of the voltage/current relationship of regulator 101 is determined by the value of resistors R1 and R2 (and to a small extent due to the values of resistors R17, R18, R21 and R22 of receiver amplifier 103 of FIG. 3) because at this low voltage across speech lead 9 and analog ground 11 transistor Q1 remains turned off. Breakpoint A occurs when transistor Q1 turns on. Thus, the slope of segment 2 of the voltage/current relationship is determined by the values of resistors R1 and R2 and R17, R18, R21 and R22 as well as the currents flowing from speech lead 9 to analog ground 11 through transistors Q1, Q2, Q3, Q4, Q5 and Q6, when transistors Q1 through Q6 turn on. Similarly, breakpoint B occurs when transistor Q101 turns on and thus the slope of segment 3 of the voltage/current relationship is determined primarily by the value of resistor R104 which determines the amount of current being shunted from speech lead 9 to analog ground 11 through transistor Q101. The slopes (i.e. the impedances) of segments 1, 2 and 3 of FIG. 1 are defined as such:

$$Z_1 \approx (R_1+R_2)//(R_{17}+R_{18})//(R_{21}+R_{22})$$

$$Z_2 \approx \frac{(R_1 + R_2)R_3R_7}{R_2R_4}$$

$$Z_3 \approx \frac{(R_1 + R_2)R_3R_{104}}{R_2R_4}$$

where
$Z_1$, $Z_2$, and $Z_3$ equal the DC impedance which regulator 101 provides across the telephone line when regulator 101 is operating on segments 1, 2 and 3, respectively, of the curve of FIG. 1;
$(R_1+R_2)//(R_{17}+R_{18})//(R_{21}+R_{22})$ = the resistance value of $(R_1+R_2)$, $(R_{17}+R_{18})$, $(R_{21}+R_{22})$ connected in parallel; and
$R_1$, $R_2$, $R_3$, $R_4$, $R_7$, $R_{17}$, $R_{18}$, $R_{21}$, $R_{22}$ and $R_{104}$ are the resistances of resistors $R_1$, $R_2$, $R_3$, $R_4$, $R_7$, $R_{17}$, $R_{18}$, $R_{21}$, $R_{22}$ and $R_{104}$, respectively.

Because the speech lead 9 and analog ground 11 serve as the speech signal transmission path, in addition to their serving as the DC voltage path, regulator 101 must provide a high impedance to voice band signal frequencies in order to prevent excessive attenuation of the voice signal. Capacitor C101 (typically 4.7 microfarads) is connected between node 31 and analog ground 11 and serves to establish the low pass filter characteristics required of the regulator circuitry 101. Because of its size, capacitor C101 is preferably provided by an external capacitor when the regulator circuitry 101 is formed as an integrated circuit device. The value of capacitor C101 is selected to provide on node 31 a low impedance to frequencies greater than approximately 200 Hz, thereby preventing the speech signals from influencing the amount of current shunted by transistor Q101.

During pulse dialing, the telephone set must provide a very low impedance to the telephone line during the "make" operation, and a very high impedance to the telephone line during the "break" operation. In the regulator circuit 101 of this invention, this is accomplished by transistors Q18 and Q19. The emitter of NPN transistor Q19 is connected to analog ground 11. The base of NPN transistor Q19 is connected to speech lead 9 via resistor R27 (20K) and also to a terminal which receives the dial outpulse signal indicating when the dialing operation is being performed. NPN transistor Q18 has its emitter connected to speech lead 9, its collector connected to node 31 and its base connected through resistor R25 (15K) to speech lead 9. The base of transistor Q18 is also connected via resistor R26 (7K) to the collector of transistor Q19. When the telephone set is not performing the dialing operation, the dialing portion of the circuit (not shown) provides a low dial outpulse signal to regulator 101. This low dial outpulse signal is applied to the base of transistor Q19, thus turning transistor Q19 off. This in turn causes PNP transistor Q18 to turn off, thereby preventing transistor Q18 from influencing node 31, and regulator 101 performs as previously described. However, during the dialing operation, the dialing portion of the circuit (not shown) provides a high dial outpulse signal to the regulator 101, thus turning on NPN transistor Q19, which in turn causes transistor Q18 to turn on, thereby supplying substantial additional current to node 31. This substantially increased current to node 31 causes a substantial increase in the voltage on node 31, thus turning off transistors Q4 and Q5 and turning on transistors Q6 and Q101. With transistor Q101 turned on in response to the high dial outpulse signal, a very low impedance is provided across speech lead 9 and analog ground 11, thus providing the required "make" operation during dialing. Thus, when the dialing circuitry (not shown), comprising a switch in series between the telephone line and speech line 9 conducts, or "makes", the regulator circuit of this invention provides an extremely low impedance across the telephone line. Similarly, when the dialing circuitry switch connected in series between the telephone line and speech line 9 opens, or "breaks", an extremely high impedance is presented across the telephone line. Thus, the dialing operation is accomplished.

Receiver Amplifier Speech Circuit—DC Operation

Figure 3:
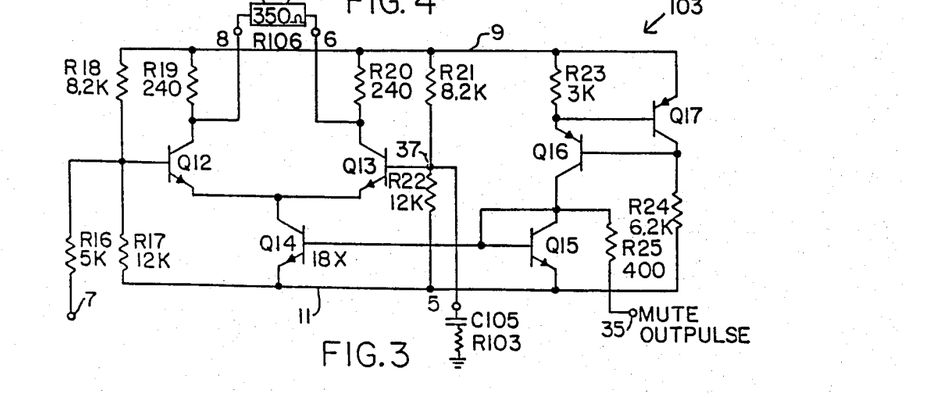
FIG. 3 is a schematic diagram of the transmitter amplifier of this invention.

The schematic diagram of one embodiment of the receiver amplifier 103 is shown in FIG. 3. The receiver earphone 77 is connected between nodes 6 and 8. This earphone is one of the two external components used in conjunction with the receiver amplifier 103, when the receiver amplifier 103 is fabricated as a single integrated circuit device. The receiver amplifier is, in the preferred embodiment of this invention, formed on the same piece of silicon in which the regulator and the transmitter amplifier are formed together with the circuitry used to form the telephone dialer and ringer.

The telephone circuits of this invention operate with as little as approximately two volts on speech lead 9, corresponding to approximately 3.2 volts on the telephone line (a polarity reversal diode bridge of well known design providing a voltage drop of approximately 1.2 volts is typically required between the telephone line and the speech lead, but such a polarity reversal bridge is not used in the type 500 telephone set). Most prior art telephone circuits, including prior art attempts to replace the discreet components of the "encapsulated circuit" referred to above with integrated circuit devices, require a minimum of approximately 3.0 volts to be applied to the telephone set from the polarity reversal bridge in order to operate properly.

PNP transistors Q16 and Q17, NPN transistor Q15, and resistors R23 (3K) and R24 (6.2K) form a current source which is substantially independent of the voltage between speech lead 9 and analog ground 11. Resistor R23 is connected between speech lead 9 and the emitter of PNP transistor Q16. The base of transistor Q16 is connected through resistor R24 (6.2K) to analog ground 11. Thus, transistor Q16 turns on, thus providing a voltage drop across resistor R23. The emitter of PNP transistor Q17 is connected to speech lead 9, the collector of transistor Q17 is connected to the base of transistor Q16, and the base of transistor Q17 is connected to the emitter of transistor Q16. Thus, because the emitter of PNP transistor Q17 is connected to speech lead 9, which is more positive than the emitter of transistor Q16, transistor Q17 also conducts. The interconnection of transistors Q16 and Q17 in this manner insures that the collector current flowing through transistor Q16 is substantially independent of the voltage across speech lead 9 and analog ground 11. In other words, as the voltage of speech lead 9 becomes more positive with respect to analog ground 11, transistor Q16 tends to turn on harder, thus providing a larger voltage drop across resistor R23. This larger voltage drop across resistor R23 causes transistor Q17 to turn on harder, thus increasing the voltage on the base of transistor Q16 (and thus decreasing the base-emitter voltage of transistor Q16), thereby tending to cause transistor Q16 to turn on less, which in turn tends to reduce the voltage drop across resistor R23. Hence, the voltage drop across resistor R23 and the collector current through transistor Q16 remain substantially constant regardless of the magnitude of the voltage difference between speech lead 9 and analog ground 11.

The collector of transistor Q16 is connected in common with the bases of NPN transistors Q14 and Q15 and the collector of transistor Q15. Transistors Q14 and Q15 are closely matched in dopant levels and ratioed in physical dimensions, and thus exhibit similar electrical characteristics. Because the betas of transistors Q14 and Q15 are equal and rather high, their base currents will be rather low. Thus the collector current of transistor Q15 is substantially equal to the collector current of transistor Q16. The collector current of transistor Q15 is defined by the operation of transistors Q16, Q17 and resistors R23, R24. Because the bases of transistors Q14 and Q15 are connected in common and their emitters are also connected in common to analog ground 11, and the emitter of transistor Q14 is designed to have an emitter area eighteen times the emitter area of transistor Q15, transistor Q15 conducts a rather small amount of collector current, while biasing transistor Q14 to carry a rather large amount of collector current equal to eighteen times the collector current of transistor Q15. In this manner, transistor Q14 mirrors by a factor of eighteen the collector current of transistor Q15 and serves as a current source which is substantially independent of the voltage across speech lead 9 and analog ground 11.

NPN transistors Q12 and Q13, which have their emitters connected in common to the collector of current source transistor Q14, form a differential amplifier. Resistor R19 (240 ohms) and resistor R20 (240 ohms) are connected between speech lead 9 and the collectors of transistors Q12 and Q13, respectively. Resistors R18 (8.2K) and R17 (12K) are connected in series between speech lead 9 and analog ground 11, thus forming a voltage divider with the node between resistors R17 and R18 connected to the base of transistor Q12. Similarly, resistors R21 (8.2K) and R22 (12K) are connected in series to form a voltage divider connected between speech lead 9 and analog ground 11 having a node formed between resistors R21 and R22 which is connected to the base of transistor Q13. Because the transistors Q12 and Q13, resistors R18 and R21, and resistors R17 and R22 are well matched and processed using semiconductor integrated circuit processing techniques, as are the collector resistors R19 and R20 connected to these transistors, the structure is substantially perfectly balanced thereby ensuring that no DC voltage appears across earphone 77 (because the voltages on nodes 6 and 8 are identical in DC operation) and thus, no DC signal is heard across the earphone. Thus, the need for an expensive and rather bulky DC blocking capacitor is eliminated.

Transistor Q15 turns off receiver amplifier 103 during the dialing operation to prevent unwanted noise in the ear of the telephone user. Normally, the mute outpulse signal provided on terminal 35 is high. This high mute outpulse signal is applied through resistor R25 (400 ohms) to the collector of transistor Q15, thus allowing normal operation of transistor Q15 as previously described. However, during dialing, a low mute outpulse signal from the dialer circuitry (not shown) is applied to the terminal 35, thus providing a connection from the base of transistors Q14 and Q15 to analog ground 11, thus shorting the bases of transistors Q14 and Q15 to their emitters, thereby turning off transistors Q14 and Q15. With transistor Q14 turned off, no current flows through transistors Q12 and Q13, thus causing the voltages on terminals 6 and 8 to be equal in magnitude to the voltage on speech lead 9. This effectively shuts off current flow through earphone 77 thus preventing earphone 77 from producing noise in response to the dialing operation.

Receiver Amplifier Speech Circuit—AC Operation

Amplification by receiver amplifier 103 will only take place if the speech signals (from speech lead 9) appearing on the bases of transistors Q12 and Q13 are unbalanced by some means, since the closely matched voltage dividers formed by resistors R18, R17 and R21, R22 will not provide such an imbalance. The imbalance is provided by the RC network formed by capacitor C105 (typically 1 to 5 microfarads) and resistor R103 (typically 2K ohms) which are connected in series between the base of transistor Q13 (node 37) and analog ground 11. In effect, the RC network formed by resistor R103 and capacitor C105 (typically 1.0 $\mu$F) provide an AC impedance in parallel with the resistance provided by R22, thus providing the required voltage imbalance between the bases of transistors Q12 and Q13 in response to the AC speech signal received across speech lead 9 and analog ground 11. The RC time constant of the RC network formed by resistor R103 and capacitor 105 defines the frequency and gain characteristics of receiver amplifier 103. Thus, capacitor C105 serves as a DC blocking capacitor and resistor R103 is selected to provide the desired amount of AC signal imbalance between the bases of transistors Q12 and Q13, thus establishing the desired gain of receiver amplifier 103.

Consequently, during the reception of an AC speech signal, the circuit comprising the matched pairs of the transistors Q12 and Q13 operates in a nonsymmetrical fashion. The signal on speech lead 9 is applied through resistors R17 and R18 to the base of transistor Q12. However, AC signals applied to node 37 are effectively grounded through resistor R103 and capacitor C105, and thus are not amplified by transistor Q13. The result is an amplified AC speech signal across the earphone 77 connected across nodes 6 and 8.

In order to control the amplitude of the sidetone, a sidetone gain signal is provided from the transmitter amplifier, as will be explained later, to terminal 7 of the receiver amplifier 103. This sidetone gain signal is 180° out-of-phase with the transmitted signal generated by the microphone and thus is 180° out-of-phase with the speech signal on speech lead 9. This out-of-phase sidetone gain signal is connected from terminal 7 to the base of transistor Q12 through resistor R16 (5K). With an increasing voltage on speech line 9, the voltage on terminal 7, and thus the voltage applied to the base of transistor Q12, decreases. This decreases the amount of AC current flowing through transistor Q12, thus counteracting to a certain extent the effect of the increasing voltage on speech lead 9. Thus, the current through transistor Q12 and thus the voltage appearing across earphone 77 due to the sidetone, is maintained at an acceptable level.

In a similar fashion, with a decreasing speech signal on lead 9, an increasing voltage is applied to terminal 7 and thus to the base of transistor Q12. This increasing voltage on the base of transistor Q12 tends to increase the current through transistor Q12, thus partially offsetting the decrease in current through transistor Q12 caused by the decreasing voltage on speech lead 9. Thus, the decreasing voltage across earphone 77 is attenuated to a certain extent, thus providing a sidetone of desired amplitude.

Transmitter Amplifier—DC Operation

Figure 4:
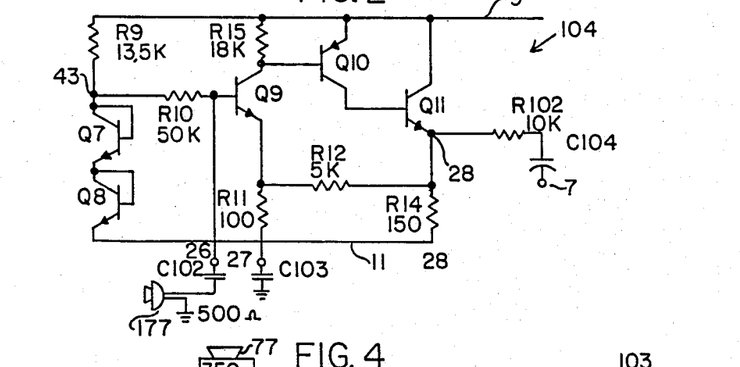
FIG. 4 is a schematic diagram of the receiver amplifier of this invention.

The schematic diagram of one embodiment of the transmitter amplifier 104 of this invention is shown in FIG. 4. The function of the transmitter amplifier 104 is to provide an AC signal on speech lead 9 in response to a signal from microphone 177 connected to the amplifier between terminal 26 and analog ground 11. Any microphone capable of generating an AC signal in response to speech (or other audible signals) is appropriate for use in this invention but preferably the microphone is an electret (such as the model EM60 manufactured by Primo Microphones, Inc). The use of an electret is preferred because of its low cost and good audio characteristics. One side of microphone 177 as shown in FIG. 4 is connected to node 26 through coupling capacitor C102 typically in the range of 0.01 to 1.0 microfarad, and the other side of microphone 177 is connected to analog ground 11. External gain adjustment of transmitter amplifier 104 is provided by adding an external resistor (not shown) in series with capacitor C103, which decreases the gain of transmitter amplifier 104 to be compatible with the type of microphone 177 used (e.g. electret, carbon button type, etc.). A resistor with a value of 100 ohms will typically reduce the gain of transmitter amplifier 104 by approximately 3 dB.

Resistor R9 (13.5K) and diode connected NPN transistors Q7 and Q8 form a low impedance voltage source, which establishes the required DC operating points of transmitter amplifier 104 and attenuates the AC speech signal on the DC voltage supply. One side of resistor R9 is connected to speech lead 9 and the other side of resistor R9 is connected in common to the collector and base of transistor Q7. The emitter of transistor Q7 is connected in common to the collector and base of transistor Q8. The emitter of transistor Q8 is connected to analog ground 11. Thus, the voltage on node 43 is equal to the sum of the base-emitter voltages of transistors Q7 and Q8. This bias circuit also serves to attenuate the effect on its output voltage appearing on node 43 due to voice signals appearing on speech lead 9, therefore reducing feedback through the transmitter amplifier power supply. Without this attenuation of the effect on the output voltage on node 43 of speech signals appearing on speech lead 9, the voltage on node 43 would increase in response to increasing speech signals, creating negative feedback to the base of transistor Q9 thus causing transmitter amplifier 104 to decrease the voltage on speech lead 9, thus decreasing the gain of transmitter amplifier 104 and impairing the operation of transmitter amplifier 104.

Transmitter Amplifier—AC Operation

The input speech signal generated by microphone 177 is applied through capacitor C102 (typically 0.047 microfarads) to the base of NPN transistor Q9. The base of NPN transistor Q9 is also connected through resistor R10 (50K) to node 43. The collector of transistor Q9 is connected through resistor R15 (18K) to speech lead 9 and the emitter of transistor Q9 is connected through resistor R11 (100 ohms) connected in series with capacitor C103 (4.7 microfarads) to analog ground 11. Thus, transistor Q9 derives its quiescent base current from node 43 through resistor R10. The base current of transistor Q9 is modulated in response to the AC speech signal provided by microphone 177. PNP transistor Q10 has its emitter connected to speech lead 9 and its base lead connected to the collector of transistor R9. NPN transistor Q11 has its collector connected to speech lead 9, its emitter connected through resistor R14 (150 ohms) to analog ground 11, and its base connected to the collector of transistor Q10. Transistor Q9 amplifies the AC speech signal provided by microphone 177. Transistor Q10 provides a second stage of amplification of the speech signal provided by microphone 177. The collector current of transistor Q10 provides base current to transistor Q11, which serves as the output amplifier of transmitter amplifier 104.

As the AC signal provided by microphone 177 increases, transistor Q9 turns on harder, thus increasing its collector current. This increases the voltage on the base-emitter junction of transistor Q10, which in turn causes transistor Q10 to turn on harder, thus increasing the collector current of transistor Q10 which provides increased base current to transistor Q11, thus causing transistor Q11 to turn on harder. This increases the collector current of transistor Q11 which flows between speech lead 9 and analog ground 11, thus decreasing the voltage on speech lead 9 in response to the increased signal from microphone 177. Conversely, when the AC speech signal provided by microphone 177 decreases, the base voltage of transistor Q9 decreases, thus decreasing the collector current through transistor Q9. This in turn decreases the voltage on the base-emitter junction of transistor Q10, thus causing transistor 10 to turn off slightly, thus decreasing slightly the base current available to transistor Q11, thus causing transistor Q11 to turn off slightly. This in turn decreases the collector current of transistor Q11, thus decreasing the current flowing between speech lead 9 and analog ground 11, thus increasing the voltage on speech lead 9 in response to the decreased AC speech signal generated by microphone 177.

Resistor R12 (5K) connected between the emitters of transistors Q9 and Q11 provides negative feedback to the first amplifier stage formed by transistor Q9. When transistor Q11 turns on more in response to a positive speech signal from microphone 177, the voltage on the emitter of transistor Q11 increases, thus increasing the voltage on the emitter of transistor Q9, thus tending to decrease the voltage difference between the base and the emitter of transistor Q9, turning transistor Q9 off slightly, thus tending to counteract slightly the affect of an increasing speech signal generated by microphone 177. Conversely, when the collector current of transistor Q11 decreases in response to a decrease in the speech signal generated by microphone 77, the voltage on the emitter of transistor Q11 decreases, thus decreasing the voltage on the emitter of Q9, thus increasing the voltage difference between the base and the emitter of transistor Q9 and turning transistor Q9 on more, thus tending to counteract slightly the effect of the less positive speech signal generated by microphone 177. In other words, the connection of resistor $R_{12}$ between the emitters of transistors Q9 and Q11 provides negative feedback, thus establishing the AC gain of transmitter amplifier 104.

The AC gain of transmitter amplifier 104 is determined by the values of resistors R12 and R11 in the following manner: $A_V = (R_{11} + R_{12})/R_{11}$, assuming the reactance of capacitor C103 is negligable. Because DC current is blocked by capacitor C103, all DC current from node 28 through resistor $R_{12}$ is applied to the emitter of transistor Q9, thus providing unity DC gain between nodes 26 and 28, therefore assuring reliable DC bias conditions regardless of the AC gain. Transmitter amplifier 104 is a transconductance amplifier (i.e. it provides an output signal current $i_{out}$ in response to an input signal voltage $V_{IN}$). The overall transmitter amplifier gain between terminal 26 and speech lead 9 is a function of the AC transconductance of transmitter amplifier 104.

Therefore, the overall AC gain A of transmitter amplifier 104 is defined as:

$$A = g_m R_L$$

where $g_m = (\Delta i_{out})/(\Delta V_{IN}) =$ the transconductance of transmitter amplifier $104 \cong (R_{11} + R_{12})/(R_{11} R_{14})$; and
$R_L =$ the AC impedance at speech lead.

Figure 5:
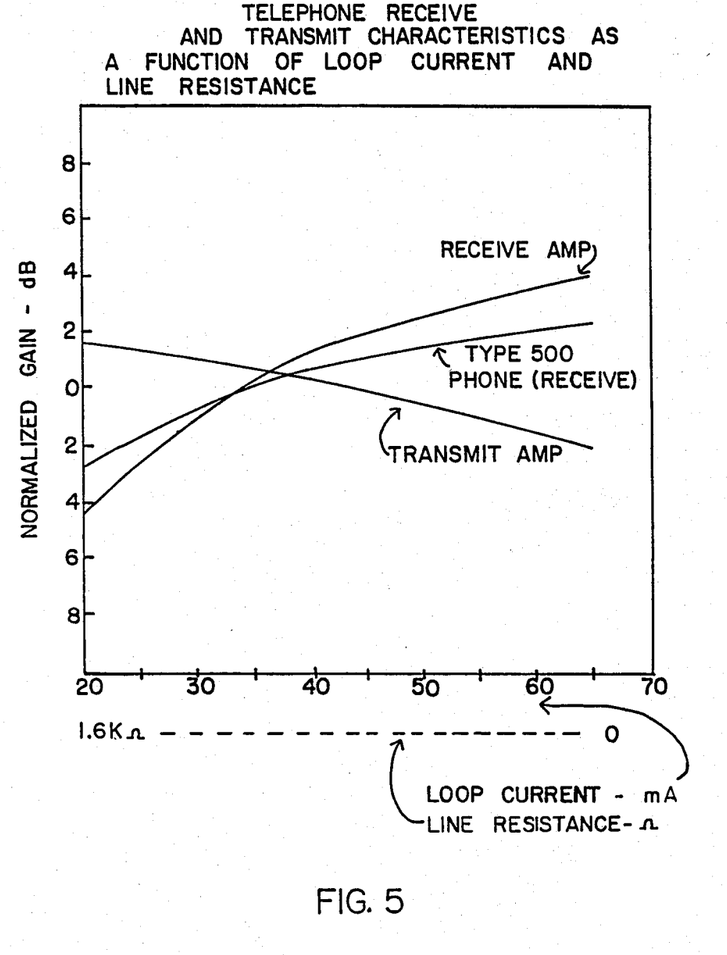
FIG. 5 is a graphical representation of the receiver amplifier and transmitter amplifier gain characteristics as a function of telephone loop current and telephone line resistance.

When the telephone setup of this invention is connected to the telephone line at a long distance from the central switching office, maximum transmitter gain is desired. On the other hand, when the telephone set of this invention is connected to the telephone line at a relatively short distance from the central switching office, the gain of the transmitter amplifier is decreased (as shown in FIG. 5) by approximately 4 db in order to maintain a desirable amplitude level of transmitted speech. This is accomplished by the fact that the transmitter amplifier 104 is a transconductance amplifier which tends to increase its gain in response to increasing loads (i.e. increasing telephone loop resistance).

As previously described in conjunction with the receiver amplifier 103, in order to control the amplitude of the sidetone, a signal is provided by transmitter amplifier 104 on terminal 28 which is connected to terminal 7 of the receiver amplifier 103 (FIG. 3). This sidetone adjust signal on terminal 7 is derived from the emitter of transistor Q11 through resistor R102 and capacitor C104. In this manner, because the sidetone adjust signal is provided by the emitter of transistor Q11, the sidetone adjust signal will be 180° out of phase with the transmitted signal generated by transistor Q11 on speech lead 9 in response to the signal generated by microphone 177. Resistor R102 is, in one embodiment of this invention, a resistor external to the integrated circuit chip containing the receiver amplifier 103 and transmitter amplifier 104. In this manner, the value of resistor R102 may be selected within the range of approximately 0 to 10K ohms (preferably 5K ohms) in order to control the amplitude of the sidetone. The capacitor C104 is used as a DC blocking capacitor in order that the DC operating points of the receiver amplifier 103 of FIG. 3 and the transmitter amplifier 104 of FIG. 4 are not altered. Capacitor C104 has a capacitance value of approximately 1 microfarad, and is preferably an external component when the circuits of this invention are fabricated as integrated circuits.

While specific embodiments of our invention have been described, it is to be understood that these embodiments are illustrative and are not to be construed as limitations on the scope of our invention. Many other embodiments of our invention will become apparent to those of ordinary skill in the art in light of the teachings of our invention.

We claim:

1. A regulator circuit for use in a telephone set having a speech lead and a ground lead which together form a telephone line to generate, in response to the telephone DC line current, a DC voltage sufficient to operate said telephone set, said regulator circuit comprising:
    a voltage divider means connected across said speech lead and said ground lead, said voltage divider means having an output node which provides an output voltage proportional to the voltage across said telephone line;
    a first amplifying means having an input node coupled to said output node of said voltage divider means for providing a first output signal when said voltage across said telephone line exceeds a first predetermined voltage, said first amplifying means shunting current between said speech lead and said ground lead when said voltage across said telephone line exceeds a first predetermined voltage;
    a second amplifying means responsive to said first output signal for providing a second output signal when said voltage across said telephone line exceeds a second predetermined voltage greater than said first predetermined voltage; and
    a current shunting means coupled across said telephone line which is responsive to said second output signal for maintaining the ratio of said telephone line voltage and said telephone DC line current within a predetermined range of magnitudes over a predetermined range of said telephone line voltage.

2. A regulator circuit according to claim 1 wherein said ratio of telephone line voltage and telephone D.C. line current comprises a first predetermined variable magnitude for a first predetermined range of telephone D.C. line currents, a second predetermined variable magnitude for a second predetermined range of telephone D.C. line currents and a substantially constant magnitude for a range of telephone D.C. line currents comprising magnitudes above said first and second predetermined ranges.

3. A regulator circuit for use in a telephone set having a speech lead and a ground lead which together form a telephone line to generate, in response to the telephone DC line current, a DC voltage sufficient to operate said telephone set, said regulator circuit comprising:
- a voltage divider means connected across said speech lead and said ground lead, said voltage divider means having an output node which provides an output voltage proportional to the voltage across said telephone line;
- an input amplifier comprising a first transistor having its base connected to said output node, its emitter connected through a first resistor to said ground lead of said telephone line, and a collector, said input amplifier turning on in response to a voltage on said output node of said voltage divider which is equal to or greater than the minimum desired voltage across said telephone line, said input amplifier operating in the linear mode to shunt an increasing current across said telephone line in response to an increasing telephone line voltage;
- a second transistor having its emitter connected to said speech lead, its base connected in common to its collector and to said collector of said first transistor;
- a third transistor having an emitter connected to said speech lead, a base connected to said base of said second transistor, and a collector connected through a second resistor to said ground lead;
- a fourth transistor having a base connected through a third resistor to said collector of said third transistor, an emitter connected through a fourth resistor to said speech lead, and a collector connected through a fifth resistor to said ground lead;
- a fifth transistor having a collector connected to said emitter of said fourth transistor, a base connected to said collector of said fourth transistor, and an emitter connected to said ground lead;
- a sixth transistor having a collector connected to said speech lead, a base connected to said collector of said fifth transistor, and an emitter connected through a sixth resistor to said ground lead; and
- a seventh transistor having a collector connected to said speech lead, a base connected to the emitter of said sixth transistor, and an emitter connected through a seventh resistor to said ground lead, whereby the telephone line voltage is maintained within a desired range in response to a wide variety of telephone line currents.

4. Structure as in claim 3 which further includes a capacitor connected between said collector of said third transistor and said ground lead, whereby said capacitor serves as a low pass filter thus causing said regulator circuit to operate independently of the speech signal on said telephone line.

5. Structure as in claim 3 wherein said first, second, fifth, sixth and seventh transistors are NPN transistors and said third and fourth transistors are PNP transistors.

6. Structure as in claim 3 wherein said regulator circuit also includes means for turning off said amplifier means in response to a signal indicating that the dialing operation is being performed by said telephone set.

7. Structure as in claim 6 wherein said means for turning off comprises:
- a dial input terminal for receiving a dial outpulse signal indicating that the dialing operation is being performed;
- a pullup means connected between said dial input terminal and said speech lead;
- an eighth transistor having a base connected to said dial input terminal, an emitter connected to said ground lead, and a collector; and
- a ninth transistor having an emitter connected to said speech lead, a collector connected to said collector of said third transistor, and a base connected through an eighth resistor to said speech lead and through a ninth resistor to said collector of said eighth transistor.

8. Structure as in claim 7 wherein said eighth transistor is an NPN transistor and said ninth transistor is a PNP transistor.

9. Structure as in claim 8 wherein said amplifier is turned off in response to a high signal on said dial input node and said amplifier is turned on in response to a low signal on said dial input node.

* * * * *